(12) United States Patent
Kim et al.

(10) Patent No.: US 11,847,849 B2
(45) Date of Patent: Dec. 19, 2023

(54) SYSTEM AND METHOD FOR COMPANION ANIMAL IDENTIFICATION BASED ON ARTIFICIAL INTELLIGENCE

(71) Applicant: KOREA INSTITUTE OF SCIENCE AND TECHNOLOGY, Seoul (KR)

(72) Inventors: Ig Jae Kim, Seoul (KR); Yu-Jin Hong, Seoul (KR); Hyeonjung Park, Seoul (KR); Minsoo Kim, Seoul (KR); Ikkyu Choi, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 189 days.

(21) Appl. No.: 17/388,013

(22) Filed: Jul. 29, 2021

(65) Prior Publication Data
US 2022/0036054 A1   Feb. 3, 2022

(30) Foreign Application Priority Data
Jul. 31, 2020   (KR) .......................... 10-2020-0096258

(51) Int. Cl.
*G06V 40/00* (2022.01)
*G06V 40/10* (2022.01)
(Continued)

(52) U.S. Cl.
CPC ............. *G06V 40/10* (2022.01); *G06F 18/214* (2023.01); *G06V 10/243* (2022.01); *G06V 10/40* (2022.01); *G06V 10/751* (2022.01)

(58) Field of Classification Search
CPC ...... G06V 40/10; G06V 10/243; G06V 10/40; G06V 10/751; G06V 10/454; G06V 10/82;
(Continued)

(56) References Cited

U.S. PATENT DOCUMENTS 8,396,262 B2 *   3/2013   Aisaka ................. G06V 40/167
                                                348/169
8,538,044 B2 *   9/2013   Tsukizawa ............... G06T 7/73
                                                382/104
(Continued)

FOREIGN PATENT DOCUMENTS

CN      110909618 A   *  3/2020
KR      10-0795360 B1     1/2008
(Continued)

OTHER PUBLICATIONS

Jie Hu et al., "Squeeze-and-Excitation Networks," 2018 IEEE/CVF Conference on Computer Vision and Pattern Recognition, 2018, pp. 7132-7141.
(Continued)

*Primary Examiner* — Molly Wilburn
*Assistant Examiner* — Ahmed A Nasher
(74) *Attorney, Agent, or Firm* — CANTOR COLBURN LLP

(57) ABSTRACT

Embodiments relate to a companion animal identification method including acquiring a preview image for capturing a face of a target companion animal, checking if the face of the target companion animal is aligned according to a preset criterion, capturing the face of the target companion animal when it is determined that the face of the target companion animal is aligned, and identifying the target companion animal by extracting features from a face image of the target companion animal having an aligned face view, and an identification system for performing the same.

19 Claims, 11 Drawing Sheets

(51) Int. Cl.
*G06V 10/40* (2022.01)
*G06V 10/24* (2022.01)
*G06V 10/75* (2022.01)
*G06F 18/214* (2023.01)

(58) Field of Classification Search
CPC ..... G06V 10/469; G06F 18/214; G06F 18/22; G06N 20/00; G06Q 50/22; G06T 7/30
See application file for complete search history.

(56) References Cited

U.S. PATENT DOCUMENTS

| | | | |
|---|---|---|---|
| 9,762,791 B2* | 9/2017 | Deng | H04N 23/631 |
| 2011/0317874 A1* | 12/2011 | Ikenoue | G06F 3/017 |
| | | | 382/103 |
| 2015/0131868 A1* | 5/2015 | Rooyakkers | G06F 16/5866 |
| | | | 382/110 |
| 2018/0082304 A1* | 3/2018 | Summerlin | G06Q 20/3229 |
| 2018/0365858 A1* | 12/2018 | Kim | G06T 7/13 |
| 2020/0104568 A1 | 4/2020 | Liang | |
| 2021/0049355 A1* | 2/2021 | Choi | G06V 10/765 |
| 2021/0232817 A1* | 7/2021 | Gao | H04W 84/12 |

FOREIGN PATENT DOCUMENTS

| KR | 10-2014-0138103 A | 12/2014 |
|---|---|---|
| KR | 10-1788272 B1 | 10/2017 |
| KR | 10-2018-0070057 A | 6/2018 |
| KR | 10-2088206 B1 | 3/2020 |
| KR | 10-2020-0041296 A | 4/2020 |
| KR | 10-2020-0043268 A | 4/2020 |
| KR | 20200041296 A * | 4/2020 |
| KR | 10-2020-0068351 A | 6/2020 |
| KR | 10-2020-0072853 A | 6/2020 |
| KR | 10-2020-0073888 A | 6/2020 |
| KR | 10-2020-0095356 A | 8/2020 |

OTHER PUBLICATIONS

Kaiming He et al., "Deep Residual Learning for Image Recognition," 2016 IEEE Conference on Computer Vision and Pattern Recognition, 2016, pp. 770-778.

Muneeb Ul Hassan, "VGG16—Convolutional Network for Classification and Detection," Neurohive, Nov. 2018, 6 pages (https://neurohive.io/en/popular-networks/vgg16/).

Karen Simonyan et al., "Very deep convolutional networks for large-scale image recognition," International Conference on Learning Representations, 2015, 14 pages.

Christian Szegedy et al., "Going Deeper with Convolutions," 2015 IEEE Conference on Computer Vision and Pattern Recognition, 2015, pp. 1-9.

* cited by examiner

SYSTEM AND METHOD FOR COMPANION ANIMAL IDENTIFICATION BASED ON ARTIFICIAL INTELLIGENCE

CROSS-REFERENCE TO RELATED APPLICATION

This application claims priority to Korean Patent Application No. 10-2020-0096258, filed on Jul. 31, 2020, and all the benefits accruing therefrom under 35 U.S.C. § 119, the contents of which in its entirety are herein incorporated by reference.

TECHNICAL FIELD

Embodiments of the present disclosure relate to companion animal identification technology, and more particularly, to a system and method which provides a user with a guide to acquiring an image suitable for recognition of a companion animal and identifies the companion animal in the acquired image using an artificial intelligence network.

NATIONAL RESEARCH AND DEVELOPMENT SUPPORT

This work was supported by the Basic Science Research Program (Grant No. NRF-2018M3E3A1057288) of the National Research Foundation (NRF) funded by the Ministry of Science and ICT, Republic of Korea.

BACKGROUND ART

With the growing number of one-person households, low birth rate and ageing population, the percentage of households with companion animals increases and there is an increasing demand for companion animal identification technology. For example, shelters for abandoned dogs may require animal identification technology to find owners of lost or abandoned companion animals. For-profit organizations (for example, insurance companies) may require companion animal identification technology to provide personalized services (for example, companion animal insurance, etc.).

Currently, technology most commonly used to identify companion animals is typically implantation of chips for identification. However, this technology involves inserting electronic chips into living tissues through surgery or operation.

To identify companion animals without inserting electronic chips, attempts have been made to identify companion animals based on nose print of the companion animals (Patent Publication No. 10-178827 (2017 Oct. 19)). However, these attempts require an additional dedicated device such as an ultrasonic module and an iris acquisition module to collect nose prints.

DISCLOSURE

Technical Problem

According to a variety of aspects of the present disclosure, there is provided a system and method for companion animal identification based on artificial intelligence that can be implemented in the existing devices capable of image acquisition and data processing such as smartphones without requiring an additional device, and is harmless to companion animals.

Technical Solution

A system for identifying a target companion animal according to an aspect of the present disclosure includes an image acquisition unit to capture a face of the target companion animal, a display unit to display a screen including a preview image of the image acquisition unit, a view correction unit to check if the face of the target companion animal is aligned according to a preset criterion, and an identification unit to identify the target companion animal by extracting features from a face image of the target companion animal having an aligned face view.

In an embodiment, the view correction unit may be further configured to recognize an animal species of the target companion animal in the preview image of the target companion animal, and recognize physical features of the target companion animal in the preview image of the target companion animal.

In an embodiment, the view correction unit may include a first model to which the preview image of the target companion animal is applied. Here, the first model is a pre-trained machine learning model to extract first features from an input image and recognize the animal species of the companion animal in the input image based on the extracted features, and is trained using a first training dataset including a plurality of first training samples, each of the plurality of first training samples includes a face image of an animal, and each of the plurality of first training samples further includes at least one of species of the corresponding animal or subspecies of the corresponding animal.

In an embodiment, the view correction unit may include a second model to which the preview image of the target companion animal is applied. The second model may be a pre-trained machine learning model to extract second features from an input image and recognize physical features of the companion animal in the input image based on the extracted features, and may be trained using a second training dataset including a plurality of second training samples, and each of the plurality of second training samples may include a face image of an animal and the physical features of the corresponding animal.

In an embodiment, the physical features may include dolichocephalic information or brachycephalic information when the corresponding animal is a dog.

In an embodiment, the view correction unit may include a third model to which the preview image of the target companion animal is applied. The third model is a machine learning model configured to extract third features from an input image and detect a face region and a feature point in the preview image of the target companion animal based on the extracted features.

In an embodiment, the third model may be trained using a third training dataset including a plurality of third training samples. Each of the plurality of third training samples includes at least one of a face image and face region information or feature point information of the companion animal, and the face region information includes a location or size of the face region, and the feature point information includes a face component corresponding to the feature point and a location of the feature point.

In an embodiment, the feature point may include at least one of a first feature point corresponding to a left eye, a second feature point corresponding to a right eye, or a third feature point corresponding to a nose.

In an embodiment, the view correction unit may be further configured to check if a first alignment condition indicating alignment of the face of the target companion animal with respect to a yaw axis is satisfied, check if a second alignment condition indicating alignment of the face of the target companion animal with respect to a pitch axis is satisfied, and align the preview image of the target companion animal to align the face of the target companion animal with respect to a roll axis when the first alignment condition and the second alignment condition are satisfied. In the face of the target companion animal, a face view direction is the roll axis, an up or down direction is the pitch axis, and a lateral direction is the yaw axis.

In an embodiment, the first alignment condition may include at least one of locations of left and right eyes disposed at a central part of an image frame or a location of a nose disposed at a center between the left eye and the right eye. The second alignment condition may include alignment of the face such that an area of the face region in the image is equal or similar to a front view area of the face.

In an embodiment, the view correction unit may be further configured to provide a user with a guide for an unsatisfied alignment condition when the face of the target companion animal fans to satisfy at least one of the first alignment condition or the second alignment condition.

In an embodiment, the view correction unit may be further configured to enable the image acquisition unit to capture the facial images of the target companion animal in response to the face of the target companion animal satisfying the first alignment condition and the second alignment condition.

In an embodiment, the view correction unit may be configured to calculate a connection vector including first and second feature points corresponding to both eyes, calculate a rotation matrix (T) of the connection vector, and align the connection vector into a non-rotated state based on the calculated rotation matrix (T) of the connection vector.

In an embodiment, the identification unit may be further configured to generate at least one sub-patch from an entire facial image including an entire face region of the target companion animal and having the aligned face view. The at least one sub-patch may include at least one of a first sub-patch, a second sub-patch or a third sub-patch, the first sub-patch may include a first sub-region including first and second feature points corresponding to both eyes, the second sub-patch may include a second sub-region including a third feature point corresponding to a nose, and the third sub-patch may include a third sub-region including at least one of the first feature point or the second feature point and the third feature point.

In an embodiment, the identification unit may be configured to identify the target companion animal by applying the entire facial image and the at least one sub-patch to a fourth model. The fourth model may include a feature extraction part to extract features from the entire facial image and the at least one sub-patch, a matching part to classify the entire facial image and each patch to a class of an identifier that matches the target companion animal of based on the corresponding patch extracted features and a determination part to determine a final identifier that matches the target companion animal based on the extracted features for the entire facial image and each patch or the matching results for the entire facial image and each patch.

In an embodiment, the fourth model may include a pre-trained machine learning model using a fourth training dataset including a plurality of fourth training samples. The fourth training dataset may be split into subsets for each object allocated with each unique identifier.

In an embodiment, the determination part may determine the final identifier of the target companion animal by voting, bagging or boosting the acquired matching results for each patch and the entire facial image, when the matching results indicating the identifier of the class that matches the target companion animal for each patch and the entire facial image are acquired from the matching part.

In an embodiment, the determination part may calculate matching scores of the target companion animal for the class for each patch and the entire facial image, the matching scores indicating an extent to which the target companion animal matches the class for each input, combine the matching scores of the target companion animal for the class for each input, and determine the final identifier that matches the target companion animal based on the combination of the matching scores of the target companion animal for the class.

In an embodiment, a rule for combining the matching scores may include at least one of product rule, sum rule, minimax rule, median rule or weighted sum rule.

A computer-readable recording medium according to another aspect of the present disclosure stores program instructions which are readable and executable by a computing device. The program instructions are executed by a processor of the computing device to acquire a preview image for capturing a face of a target companion animal, check if the face of the target companion animal is aligned according to a preset criterion, capture the face of the target companion animal when it is determined that the face of the target companion animal is aligned, and identify the target companion animal by extracting features from a face image of the target companion animal having an aligned face view.

Advantageous Effects

The companion animal identification system according to an aspect of the present disclosure may provide a guide to users while the users are making attempts to acquire images of target companion animals to identify the companion animals. The guide is associated with a condition for face views of the target companion animals with improved companion animal identification performance.

Additionally, when the current views of the target companion animals satisfy the above-described condition, the companion animal identification system may automatically acquire images. Accordingly, it is possible to avoid inconvenience of the users who do activities for attracting the companion animals' attention to capture front view images of the companion animals or have to continue attempts until suitable images are acquired.

Furthermore, as opposed to implantable chip insertion and tattoos commonly used for companion animal identification, the companion animal identification system identifies companion animals based on artificial intelligence. Accordingly, since it does not cause direct harm to companion animals, it is possible to reduce reluctance that the companion animals and owners may feel, save the time and cost required for registration and simplify the procedure, thereby reducing consumers' burden and increasing convenience, and further, promoting the registration of the companion animals. As a result, it is possible to reduce the social costs associated with abandoned/lost pets and provide opportunities for activation of related services, for example, pet insurance products, and profit improvement of the existing related industry.

The effects of the present disclosure are not limited to the above-mentioned effects, and other effects not mentioned herein will be clearly understood by those skilled in the art from the appended claims.

DESCRIPTION OF DRAWINGS

The following is a brief introduction to necessary drawings in the description of the embodiments to describe the technical solutions of the embodiments of the present disclosure or the existing technology more clearly. It should be understood that the accompanying drawings are for the purpose of describing the embodiments of the present disclosure and are not intended to be limiting of the present disclosure. Additionally, for clarity of description, illustration of some elements in the accompanying drawings may be exaggerated and omitted.

BEST MODE

The terminology used herein is for the purpose of describing particular embodiments only and is not intended to be limiting of the present disclosure. Unless the context clearly indicates otherwise, the singular forms as used herein include the plural forms as well. The term "comprises" when used in this specification, specifies the presence of stated features, regions, integers, steps, operations, elements and/or components, but does not preclude the presence or addition of one or more other features, regions, integers, steps, operations, elements and/or components.

Unless otherwise defined, all terms including technical and scientific terms used herein have the same meaning as commonly understood by those skilled in the art. It will be further understood that terms, such as those defined in commonly used dictionaries, should be interpreted as having a meaning that is consistent with their meaning in the context of the relevant art document and the present disclosure, and will not be interpreted in an idealized or overly formal sense unless expressly so defined herein.

In the specification, a companion animal refers to a variety of animals including pets and livestock. The companion animal is not limited to dogs, and may include cats, hamsters, parrots, lizards, cow, horses, sheep, pigs, etc.

Hereinafter, the embodiments of the present disclosure will be described in detail with reference to the accompanying drawings.

Figure 1:
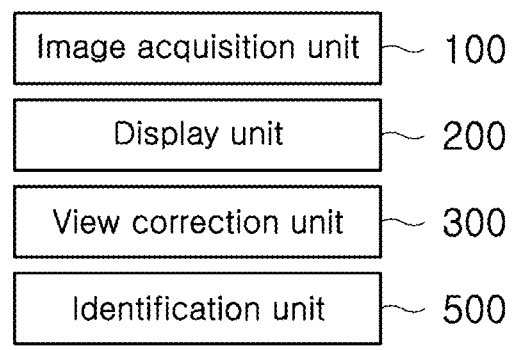
FIG. 1 is a schematic block diagram of a companion animal identification system based on artificial intelligence according to an embodiment of the present disclosure.
Figure 2:
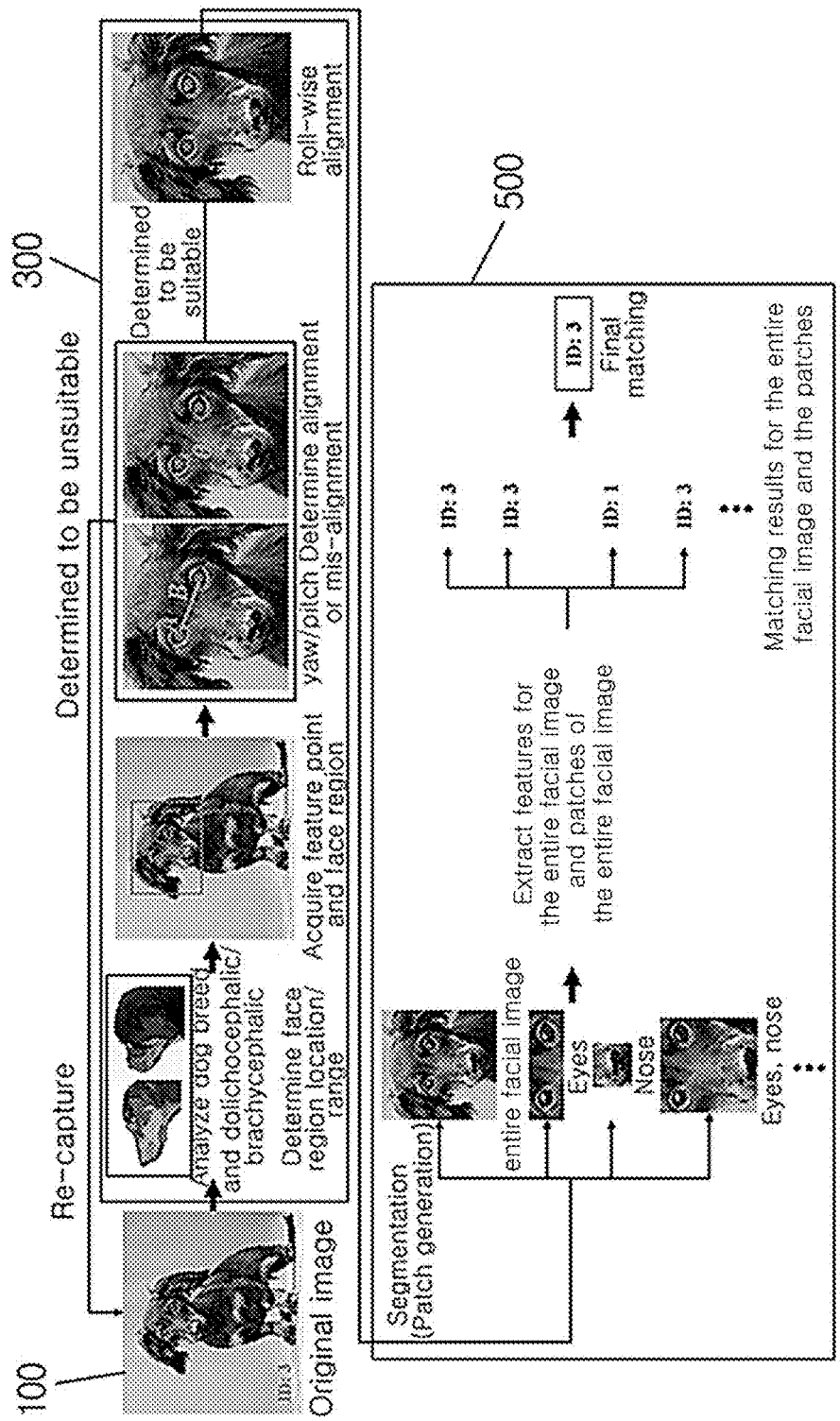
FIG. 2 is a conceptual diagram of the operation of the companion animal identification system of FIG. 1.

FIG. 1 is a schematic block diagram of a companion animal identification system based on artificial intelligence according to an embodiment of the present disclosure, and FIG. 2 is a conceptual diagram of the operation of the companion animal identification system of FIG. 1.

Referring to FIG. 1 the companion animal identification system based on artificial intelligence (hereinafter the "companion animal identification system") 1 may include an image acquisition unit 100, a display unit 200, a view correction unit 300 and an identification unit 500.

The companion animal identification system 1 according to embodiments may have aspects of entirely hardware, entirely software, or partly hardware and partly software. For example, the system may refer collectively to hardware capable of processing data and software that manages the hardware. The term "unit", "module", "device" or "system" as used herein is intended to refer to a combination of hardware and software that runs by the corresponding hardware. For example, the hardware may be a data processing device including a Central Processing Unit (CPU), a Graphic Processing Unit (GPU) or other processor. Additionally, the software may refer to a process being executed, an object, an executable, a thread of execution and a program.

The image acquisition unit 100 is configured to acquire a face image of a companion animal by capturing the face of the companion animal. The face image of the companion animal includes the entire face of the companion animal or a part of the face. Certain embodiments, the image acquisition unit 100 is configured to capture the entire facial image of the companion animal. The entire facial image will be described in more detail below.

The image acquisition unit 100 may include a camera module of a smartphone, but is not limited thereto, and may include a variety of devices capable of capturing an object and generating and transmitting image data, for example, digital cameras.

The image acquisition unit 100 may acquire at least one face image for one target companion animal. For example, the image acquisition unit 100 may capture a plurality of frames for one target companion animal.

The image acquisition unit 100 acquires the face image of the target companion animal, and provides face image data of the target companion animal to the view correction unit 300 or the identification unit 500.

The display unit 200 displays and outputs information processed by the companion animal identification system 1.

In an embodiment, the display unit 200 may display a screen including a preview image of the image acquisition unit 100. The companion animal identification system 1 displays the screen including the preview image corresponding to the input image of the image acquisition unit 100 on the entire screen of the display unit 200 or a part of the screen. A user may see an image of the target companion animal through the preview screen before the image is acquired.

Additionally, the display unit 200 may display a guide for a suitable image having a face view satisfying a preset alignment condition as described below, or an identification result.

The display unit 200 may provide the preview image to the view correction unit 300.

The view correction unit 300 may provide a guide to capture the facial images of the target companion animal by the image acquisition unit 100. To this end, the view correction unit 300 may check if the face of the target companion animal is currently aligned to satisfy the preset alignment condition based on the preview image received from the display unit 200.

Additionally, the view correction unit 300 may correct the face image into the image suitable for recognition of the companion animal. For example, since there is no need to provide the guide, the view correction unit 300 may directly perform a roll axis alignment operation as described below in the acquired image.

The image suitable for identification is acquired by the view correction operation of the view correction unit 300 such that the face of the target companion animal is aligned for a view with high recognition performance. The view correction operation will be described in more detail with reference to FIGS. 3 to 9.

The view correction unit 300 is configured to extract features from the face in the original image of the target companion animal. The view correction unit 300 is further configured to recognize an animal species of the companion animal based on the extracted features.

In an embodiment, the view correction unit 300 may include an animal species recognition model (or referred to as a first model). The animal species recognition model is a pre-trained machine learning model to extract the features from the input image and recognize the animal species of the companion animal in the input image based on the extracted features. The features extracted by the first model are features for recognizing the animal species of the companion animal and may be referred to as first features.

The animal species recognition model may have a variety of neural network structures. For example, the animal species recognition model may have a Convolutional Neural Network (CNN) structure, but is not limited thereto.

The animal species recognition model is trained using a first training dataset. The first training dataset may be split into subsets for each animal species. Additionally, the subset for each animal species may be, in turn, split into subsets for each subspecies.

The first training dataset includes a plurality of first training samples. Each first training sample may include a face image of an animal. Additionally, each first training sample may further include a species of the corresponding animal and/or a subspecies of the corresponding animal.

In an example, the first training dataset may include a plurality of first training samples associated with a dog. The plurality of first training samples may be split into subsets for each dog breed. Each of the plurality of first training samples may include a face image of the dog, species information indicating the dog and subspecies information indicating the dog breed. Then, in the above example, when the dog's face is inputted to the trained animal species recognition model using the face image of the target companion animal, the dog breed is recognized, thereby yielding dog breed information.

Additionally, the view correction unit 300 is further configured to recognize physical features of the target companion animal. The physical features affect the recognition of the image, and in the case of a dog, the physical features may include a dolichocephalic or a brachycephalic.

In an embodiment, the view correction unit 300 may include a physical feature recognition model (or referred to as a second model). The physical feature recognition model is a pre-trained machine learning model to extract the features from the input image, and recognize the physical features of the companion animal in the input image based on the extracted features. The features extracted by the second model are features for recognizing the physical features of the companion animal and may be referred to as second features.

The physical feature recognition model may have a variety of neural network structures. For example, the physical feature recognition model may have a CNN structure, but is not limited thereto.

The physical feature recognition model is trained using a second training dataset. The second training dataset may be split into subsets for each object. In some embodiments, the second training dataset may share the same image with the first training dataset.

The second training dataset includes a plurality of second training samples. Each second training sample includes a face image of an animal and physical features of the corresponding animal. The physical features may be different for each animal species. In an embodiment, each of the plurality of second training samples may further include an animal species associated with the physical features.

In an example, the second training dataset may include a plurality of second training samples associated with a dog. Each of the plurality of second training samples includes a face image of the dog, and physical feature information of the dog. When the corresponding animal is a dog, the physical feature information may include information indicating whether the corresponding dog has a dolichocephalic or a brachycephalic (for example, dolichocephalic information or brachycephalic information). Then, in the above example, when the dog's face is inputted to the trained physical feature recognition model using the face image of the target companion animal, a dolichocephalic or a brachycephalic is recognized, thereby yielding dolichocephalic information or a brachycephalic information.

The process of training the physical feature recognition model or the companion animal species recognition model using the training dataset is well known to those having ordinary skill as the process of training the CNN machine learning model, and its detailed description is omitted herein.

In an embodiment, when a plurality of face images is received, the view correction unit 300 may recognize the animal species or physical features using any of the plurality of face images. For example, the first one of the plurality of received face images may be used. However, the present disclosure is not limited thereto.

The view correction unit 300 is further configured to determine a face region and a feature point in the face image of the target companion animal.

In an embodiment, the view correction unit 300 may include a face analysis model (or referred to as a third model). The view correction unit 300 may extract the face region and the feature point in the original input image using the face analysis model. The face analysis model is configured to extract the features from the input image, and determine the face region including the face part of the object in the input image based on the extracted features. Additionally, the face analysis model is further configured to extract the features from the input image, and determine the feature point disposed at the face part of the object in the input image based on the extracted features. The features extracted by the third model are features for determining the feature point of the face and may be referred to as a third feature.

In an embodiment, the feature point may include a first feature point corresponding to the left eye, a second feature point corresponding to the right eye and a third feature point corresponding to the nose. However, the feature point is not limited thereto, and may include an identifiable point in the face region required to recognize through at least part of the face of the animal.

In an embodiment, the face analysis model may be a trained machine learning model using a third training dataset. The face analysis model may have a variety of neural network structures. For example, the face analysis model may have a CNN structure, but is not limited thereto.

The face analysis model is trained using the third training dataset including a plurality of third training samples. Each of the plurality of third training samples includes a face image of an object, face region information of the object and feature point information. The face region information may include the location, region size and boundary of the face region in the image. The feature point information may include the location of the feature point, the size of the feature point and boundary in the image.

In an example, the third training dataset may include a plurality of third training samples associated with a dog. Each of the plurality of third training samples may include a face image of the dog, and a face region and a feature point of the dog.

Figure 3:
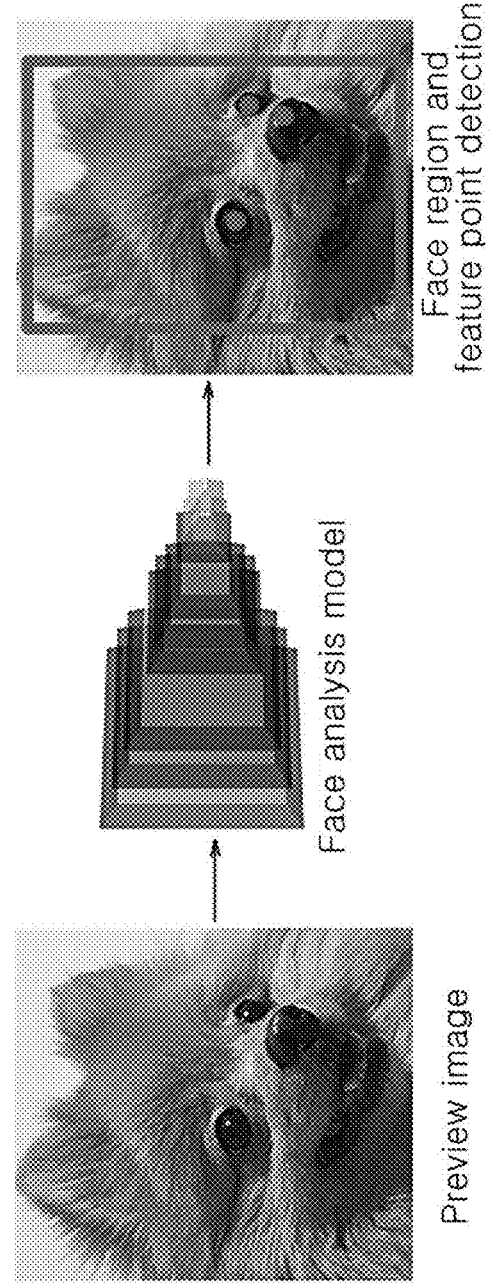
FIG. 3 is a diagram showing face region/feature point extraction results according to an embodiment of the present disclosure.

FIG. 3 is a diagram showing face region/feature point extraction results according to an embodiment of the present disclosure.

In the above example, the face of the dog is inputted to the trained face analysis model using the face image of the target companion animal, the face region including the face part and the feature point are determined as shown in FIG. 3, and finally, the face region and the feature point may be extracted.

In some embodiments, the feature point may be formed with a smaller area than the face region. In this case, the location of the feature point may be a location of a point (for example, a center point) in a region having the corresponding area.

The view correction unit 300 is further configured to check if the face image of the target companion animal satisfies a first alignment condition.

The first alignment condition is a condition for determining if the face of the companion animal is aligned with respect to the yaw axis. In the face, a face view direction is the roll axis, an up/down direction is the pitch axis, and a lateral direction is the yaw axis.

The first alignment condition includes the locations of the left/right eyes disposed at the central part of the image frame and/or the location of the nose disposed at the center between the left eye and the right eye.

In an embodiment, the view correction unit 300 may check if the face in the face image of the target companion animal satisfies the first alignment condition based on at least one of the first to third feature points.

The view correction unit 300 may determine if the locations of the left/right eyes are disposed at the central part of the image frame by calculating if the locations of the first and second feature points corresponding to the left/right eyes are disposed at the central part of the image frame.

The view correction unit 300 may determine if the location of the nose is disposed at the center between the left eye and the right eye using a connecting line between the first and second feature points corresponding to the left/right eyes and the third feature point corresponding to the nose.

In some embodiments, when the third feature point is projected onto the connecting line and the projection point is disposed at the center of the connecting line, it is determined that the location of the nose is disposed at the center between the left eye and the right eye. For example, when the distance between the projection point and the first feature point of the left eye and the distance between the projection point and the second feature point of the right eye are equal or similar (within a predetermined tolerance interval), it is determined that the location of the nose is disposed at the center.

Figure 4:
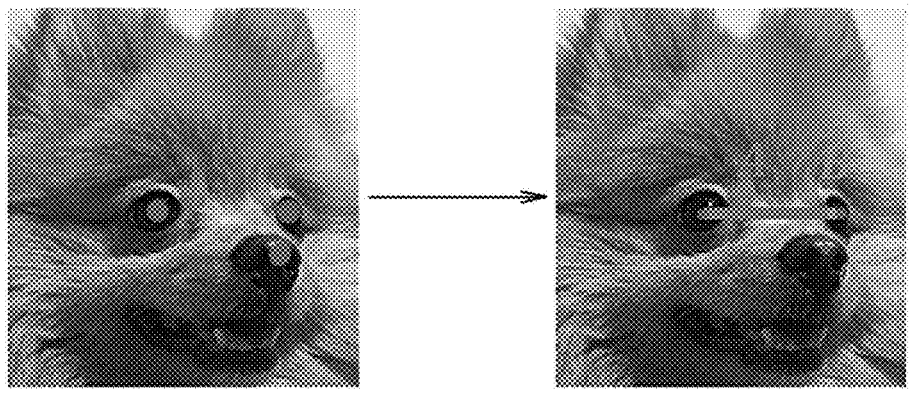
FIG. 4 is a diagram illustrating a process of checking a first alignment condition according to an embodiment of the present disclosure.

FIG. 4 is a diagram illustrating a process of checking the first alignment condition according to an embodiment of the present disclosure.

Referring to FIG. 4, the first to third feature points are extracted from the face image of the dog. Subsequently, a connecting line between the first feature point A and the second feature point B is formed, and when a projected location of the third feature point C onto the connecting line is included at the center of the connecting line, it is determined that the location of the nose is disposed at the center between the left eye and the right eye in the dog's face.

In an embodiment, a strong pose alignment criterion which determines that the first alignment condition is satisfied when the projected location of the third feature point C onto the connecting line is disposed at the center of the connecting line between the first feature point A and the second feature point B may be used. In another embodiment, a moderate pose alignment criterion which determines that the first alignment condition is satisfied when the third feature point C is disposed on the connecting line between the first feature point A and the second feature point B may be used. In this instance, a threshold for how much yaw axial pose change is allowed as the moderate criterion condition may be set and used. The threshold refers to an allowable range of points in which the projected location of the third feature point onto the connecting line is allowed to be disposed on the connecting line between the first feature point A and the second feature point B. For example, when the threshold is set to 20%, it means that the projected location of the third feature point C should be disposed within the range of 20% from the center of the connecting line to each of the first feature point A and the second feature point B. The threshold may be determined according to breed or an individual's snout shape.

Additionally, the view correction unit 300 checks if the face image of the target companion animal satisfies a second alignment condition. The second alignment condition is a condition for determining if the face of the companion animal is aligned with respect to the pitch axis.

The second alignment condition may include the face aligned to match the area of the face region in the image with the front view area of the face. Here, alignment to match the front view area of the face indicates a situation in which the face points toward the image acquisition unit 100 so it is possible to capture the entire front part or almost the entire front part. When the head is lowered or raised, the face is captured with a smaller area than the front view area.

In an embodiment, the view correction unit 300 may check if the face in the face image of the target companion animal satisfies the second alignment condition based on at least one of the first to third feature points.

The view correction unit 300 may check if the face in the face image of the target companion animal satisfies the second alignment condition by comparing an angle between a first connecting line connecting the first feature point to the second feature point and a second connecting line connecting any one of the first feature point and the second feature point to the third feature point with a preset reference angle.

In an embodiment, the reference angle may be set according to the physical features. When the physical features of the object in the input image are recognized by the physical feature recognition model, the view correction unit 300 checks if the second alignment condition is satisfied using the preset reference angle for the recognized physical features.

In particular embodiments, the reference angle may include a first reference angle for the dolichocephalic and a second reference angle for the brachycephalic. The second reference angle is larger than the first reference angle. For example, the first reference angle may range from 40° to 50° (for example, about 45°). The second reference angle may range from 50° to 70° (for example, about 60°).

Figure 5:
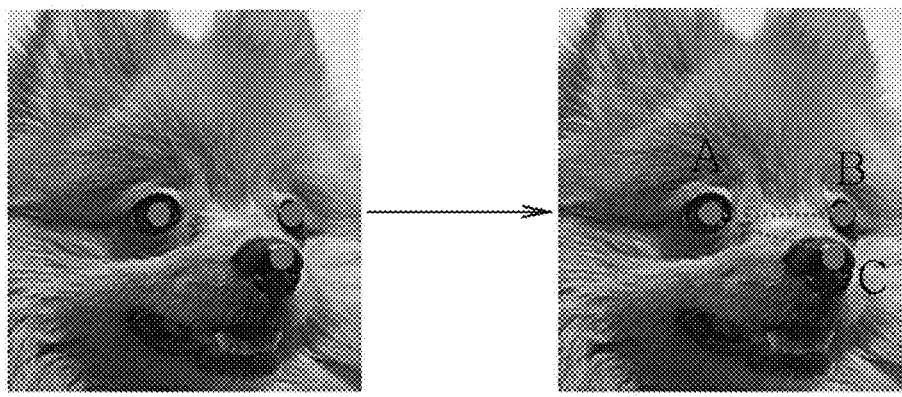
FIG. 5 is a diagram illustrating a process of checking a second alignment condition according to an embodiment of the present disclosure.

FIG. 5 is a diagram illustrating a process of checking the second alignment condition according to an embodiment of the present disclosure.

The face image of the dog of FIG. 5 may be acquired by the image acquisition unit 100. In particular embodiments, the face image of the dog may be acquired as a preview image. Then, the view correction unit 300 may recognize that the dog breed of the dog of FIG. 5 is Pomeranian based on the face image (for example, the preview image) of the dog of FIG. 5. Additionally, the view correction unit 300 may recognize that the physical features of the dog of FIG. 5 have a brachycephalic.

Subsequently, the view correction unit 300 may check if the face of Pomeranian of FIG. 5 is aligned to satisfy the second alignment condition. Since the physical features of the face image of FIG. 5 have the brachycephalic, the second reference angle for the brachycephalic is used to check if the second alignment condition is satisfied. When the angle of FIG. 5 matches the second reference angle (for example, 45°, the view correction unit 300 determines that the face of the target dog is aligned to satisfy the second alignment condition.

The view correction unit 300 provides the user with a result of checking if the face of the target companion animal is aligned to satisfy the first alignment condition and the second alignment condition.

Figure 6:
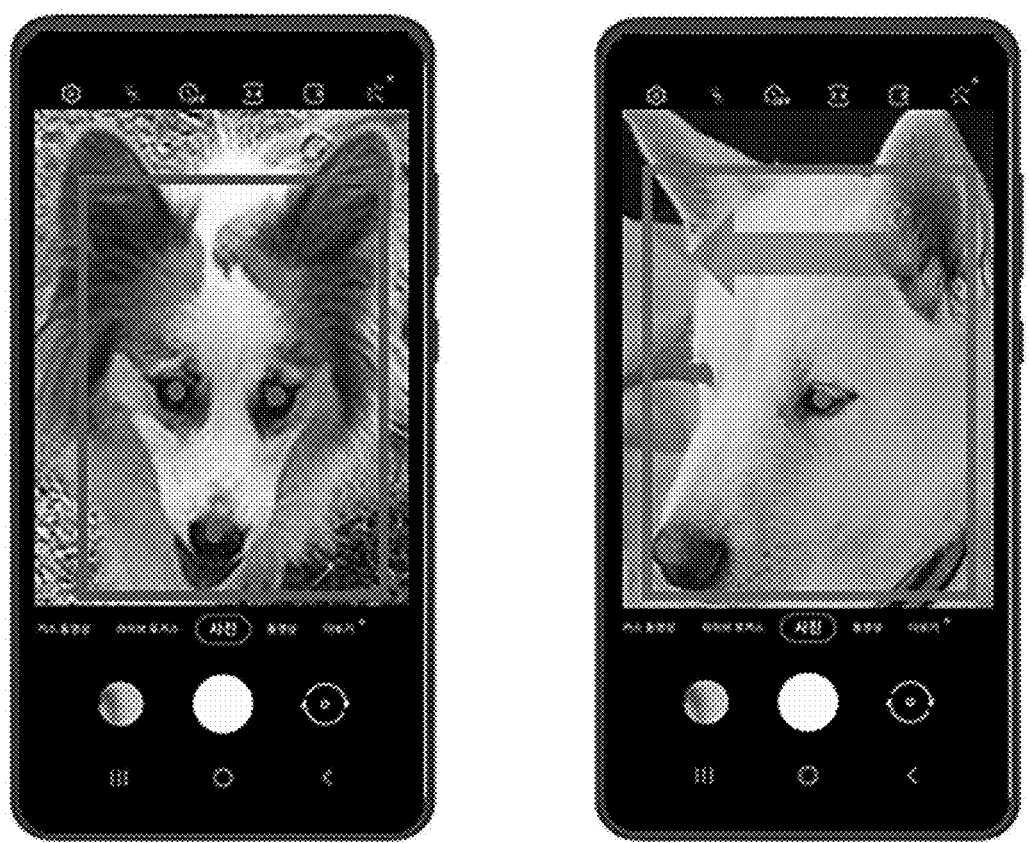
FIG. 6 is a diagram illustrating the provision of alignment condition checking results according to an embodiment of the present disclosure.

FIG. 6 is a diagram illustrating the provision of the alignment condition checking results according to an embodiment of the present disclosure.

Referring to FIG. 6, when the face of the target companion animal is aligned to satisfy the first alignment condition and the second alignment condition, the companion animal identification system 1 provides a positive feedback. On the contrary, when the face of the target companion animal does not satisfy at least one of the first alignment condition or the second alignment condition, the companion animal identification system 1 provides a negative feedback for the unsatisfied alignment condition to the user.

The positive or negative feedback may be represented in different colors and provided to the user. For example, the positive feedback may be represented in green and the negative feedback may be represented in red as shown in FIG. 6.

Additionally, the view correction unit 300 may provide a guide to re-aligning the face so that the target companion animal satisfies the first alignment condition and the second alignment condition in the current state. The guide may be provided at the same time with the negative feedback as shown in FIG. 6, or may be provided following the provision of the negative feedback.

Figure 7A:
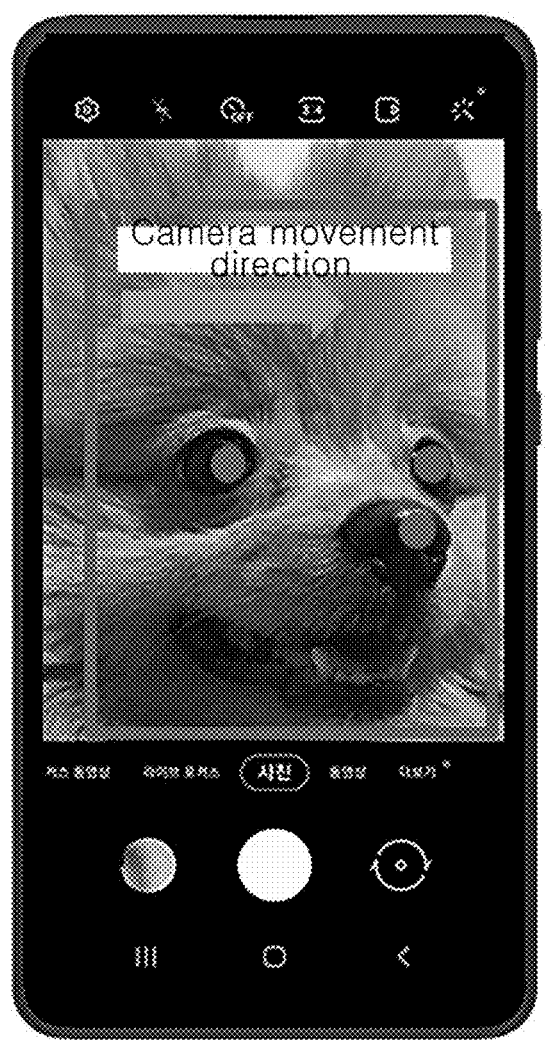
FIGS. 7A and 7B are diagrams showing a guide of a first alignment condition according to an embodiment of the present disclosure.
Figure 7B:

FIGS. 7A and 7B are diagrams showing the guide of the first alignment condition according to an embodiment of the present disclosure.

The guide includes a first guide to aligning the face of the target companion animal with respect to the yaw axis. The first guide may be a guide to placing the nose between both eyes of the target companion animal. The first guide may be provided when the nose of the target companion animal is not projected onto the center of the connecting line between both eyes in the process of checking the first alignment condition. When the face of the target companion animal is not properly aligned with respect to the yaw axis, the view correction unit 300 provides the first guide by guiding a direction for placing the nose between both eyes to the user. The direction may be represented as a camera movement direction as shown in FIG. 7A or a head movement direction as shown in FIG. 7B.

With the guide of FIG. 7, it is possible to acquire the preview image with an adjusted view to satisfy the first alignment condition.

Figure 8A:
FIGS. 8A and 8B are diagrams showing a guide of a second alignment condition according to an embodiment of the present disclosure.
Figure 8B:

FIGS. 8A and 8B are diagrams showing the guide of the second alignment condition according to an embodiment of the present disclosure.

The guide includes a second guide to aligning the face of the target companion animal with respect to the pitch axis. The second guide may be a guide to matching the angle formed between the first connecting line between both eyes of the target companion animal and the second connecting line between any eye and the nose with the reference angle. The second guide may be provided when the angle of the target companion animal does not match the reference angle in the process of checking the second alignment condition. When the face of the target companion animal is not properly aligned with respect to the pitch axis, the view correction unit 300 provides the second guide by guiding a direction for matching the angle of the target companion animal with the reference angle to the user. The direction may be represented as a camera movement direction as shown in FIG. 8A or a head movement direction as shown in FIG. 8B.

With the guide of FIG. 8, it is possible to acquire the preview image having an adjusted view to satisfy the second alignment condition.

In an embodiment, when the face of the target companion animal satisfies the first alignment condition and the second alignment condition, the view correction unit 300 enables the image acquisition unit 100 to capture the target companion animal to acquire an image having a suitable face view, in response to the conditions being satisfied.

Even though the user fails to acquire an image while the companion animal is moving, when the condition associated with alignment of pose orientation is satisfied, the companion animal identification system 1 automatically captures an image and registers it in a database to provide the user with registration convenience.

In optional embodiments, when the first and second alignment conditions are satisfied, the view correction unit 300 aligns the face image of the target companion animal to align the face of the target companion animal with respect to the roll axis. It is because an image having face rotation around the roll axis has lower identification performance.

The alignment or mis-alignment with respect to the pitch/yaw axis may be determined in the preview image or the image, and the alignment with respect to the roll axis may be performed in the image acquired for recognition. The image alignment with respect to the roll axis does not cause image distortion such as warping. For example, the view correction unit 300 may rotate the image at a predetermined angle for roll-wise alignment.

In an embodiment, the view correction unit 300 may calculate a connection vector including the first and second feature points corresponding to both eyes, calculate a rotation matrix T of the connection vector, and align the connection vector into a non-rotated state based on the calculated rotation matrix T of the connection vector.

Figure 9:
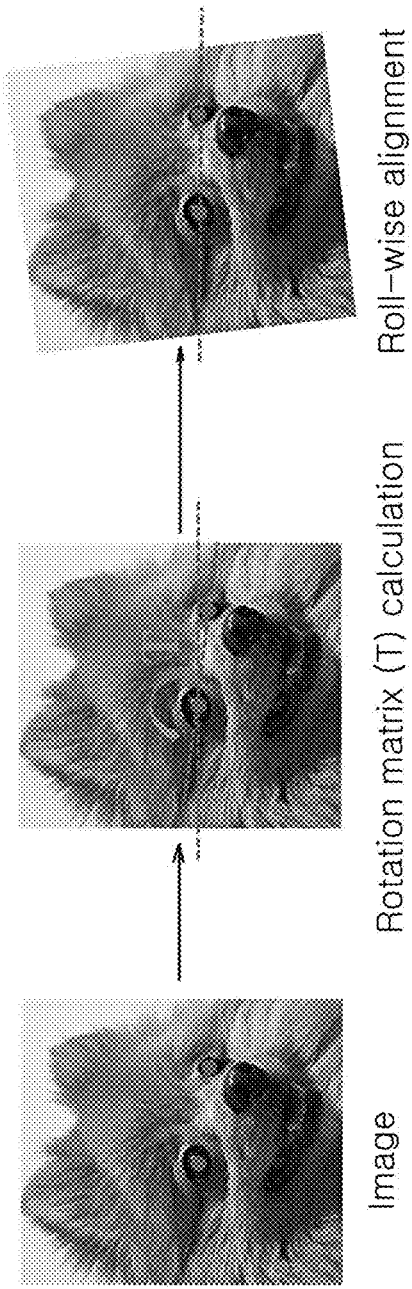
FIG. 9 is a diagram illustrating roll-wise alignment according to an embodiment of the present disclosure.

FIG. 9 is a diagram illustrating the roll-wise alignment according to an embodiment of the present disclosure.

Referring to FIG. 9, the rotation matrix T is calculated based on the first and second feature points. The connection vector including the first and second feature points is re-aligned based on the calculated rotation matrix T.

The view correction unit 300 provides the image including the entire face region of the target companion animal and having the aligned face view to the identification unit 500. Additionally, the view correction unit 300 may further provide the face region and the feature point information of the target companion animal to the identification unit 500.

The identification unit 500 is configured to extract the features from the image including the entire face region of the target companion animal and having the aligned face view, and identify the target companion animal based on the extracted features.

The entire facial image including the entire face region of the target companion animal. The entire facial image maybe includes the aligned face view includes the whole face region. Herein, the image including the entire face region of the target companion animal and having the aligned face view may be referred to as an entire facial image (or referred to as "entire facial patch"). The identification unit 500 extracts a sub-region from the aligned image of the target companion animal to generate a sub-image (or referred to as a "sub-patch").

In an embodiment, the identification unit 500 may extract the sub-patch including a first sub-patch, a second sub-patch and/or a third sub-patch from the entire facial image. The first sub-patch includes a first sub-region including the first and second feature points corresponding to both eyes. The second sub-patch includes a second sub-region including the third feature point corresponding to the nose. The third sub-patch includes a third sub-region including at least one of the first feature point or the second feature point and the third feature point. To this end, the identification unit 500 may extract the sub-region and generate the sub-patch using the feature point information determined by the view correction unit 300.

In an example, as shown in FIG. 2, the identification unit 500 may generate the first sub-patch including both eyes, the second sub-patch including the nose and the third sub-patch including both eyes and the nose from the entire facial image.

The identification unit 500 identifies the companion animal in each patch by extracting the features from each of at least one sub-patch and the entire facial image.

In an embodiment, the identification unit 500 includes a companion animal identification model (or referred to as a fourth model). The identification unit 500 may identify the target companion animal by applying the entire facial image and the sub-patch including at least one of the first to third sub-patches to the companion animal identification model.

The companion animal identification model includes a feature extraction part to extract the features from the entire facial image and at least one sub-patch. The features of the entire facial image, the features of the first sub-patch, the features of the second sub-patch and the features of the third sub-patch may be respectively extracted from the entire facial image, the first sub-patch, the second sub-patch and the third sub-patch by the feature extraction part. The features extracted by the fourth model are features for identification, i.e., determination of an identifier of the companion animal and may be referred to as fourth features.

Additionally, the companion animal identification model may include a matching part to classify the entire facial image and patches of the entire facial image to a class of the identifier that matches the target companion animal in the corresponding patch based on the extracted features; and a determination part to determine a final identifier that matches the target companion animal based on the extracted features for the entire facial image and each patch or the matching results for the entire facial image and each patch.

The companion animal identification model may include a pre-trained machine learning model using a fourth training dataset including a plurality of fourth training samples. The fourth training dataset may be split into subsets for each object allocated with a unique identifier. For example, the fourth training dataset may be subset into a first identifier ID:1, a second identifier ID:2, ..., an $n^{th}$ identifier ID:n in FIG. 2. When the training is completed using the fourth training dataset, the companion animal identification model is configured to classify into a plurality of classes, each class corresponding to each identifier.

Each of the plurality of fourth training samples includes an identifier of an animal. Additionally, each of the plurality of fourth training samples may further include the entire facial image and/or at least one sub-patch (for example, the first sub-patch, the second sub-patch and/or the third sub-patch) of the corresponding animal. When the companion animal identification model is trained using the fourth training dataset, the parameters of the companion animal identification model are updated while the training is in progress, and when the training is completed, the updating is completed.

In particular embodiments, the feature extraction part and the matching part may be incorporated into structures of various machine learning models used to classify an object in an input image by extracting features from the input image. The structure of the machine learning model may include, for example, ResNetv (for example, Resnet—101, Resnet—152, etc.), VGGNet (for example, VGG16, VGG19, etc.), Ipoed Residual-Squeeze and excitation networks (IR-SE), but is not limited thereto and may be incorporated into a variety of CNN based classification models. When the feature extraction part and the matching part are incorporated into a CNN model, the feature extraction part may include a convolutional layer, and the matching part may include a fully connected layer.

The determination part identifies the target companion animal by determining the final identifier of the target companion animal based on the result of classifying into classes based on the features for each patch, i.e., the result of matching with the identifier of the target companion animal for each patch.

When the identifier of the class that matches the target companion animal for each patch is determined by the matching part, the determination part may determine the final identifier of the target companion animal based on the matching results for each patch, and finally determine the identity of the target companion animal using the final identifier.

In an embodiment, the determination part may determine the final identifier of the target companion animal by applying an ensemble technique to the matching results for each patch. The ensemble technique may include, for example, voting, bagging and boosting, but is not limited thereto.

As shown in FIG. 2, assume that the third identifier ID:3 is acquired using the matching results of the entire facial image, the first sub-patch and the third sub-patch, and the first identifier ID:1 is acquired using the matching results of the second sub-patch. When the voting based ensemble technique is used, the most frequently matched identifier is determined as the final identifier. The identification unit 500 identifies the target companion animal using the final identifier.

In another embodiment, when the matching results for each patch are calculated as scores by the matching part, the determination part is configured to calculate a final score of the target companion animal based on the matching scores calculated for each patch. The matching scores may be calculated based on data acquired by the feature extraction part and/or the matching part.

The matching part of the companion animal identification model may calculate the matching scores of the target companion animal for the class of each identifier based on the features extracted from the input patch. For example, for a first class, the matching part of the companion animal identification model may calculate a first matching scores of the target companion animal for the entire facial image; a second matching scores of the target companion animal for the first sub-patch, a third matching scores of the target companion animal for the second sub-patch and/or a fourth matching scores of the target companion animal for the third sub-patch.

The matching scores indicates the matching extent between the target companion animal and the identifier of the class. The matching scores may be calculated through a variety of geometric similarities (for example, cosine similarity, Euclidean similarity) or a classifier of a machine learning model (for example, a CNN classifier).

In an example, the matching scores for the class calculated by the classifier of the machine learning model is set to have a higher value with the increasing probability that the target companion animal in the input patch will belong to the corresponding class. The matching scores may be a probability value itself, but may be calculated by normalizing the probability value to a specific range of values (for example, 1 to 100).

In an embodiment, the determination part of the companion animal identification model combines the matching scores of the target companion animal for each patch, and calculates the final score of the target companion animal based on the combination of the matching scores of the target companion animal for the classes. The final scores may be combined for each same class. Accordingly, in the case of a plurality of classes, a set of final scores of the target companion animal may be acquired.

When the matching results for each patch are calculated as scores by the matching part, the determination part is configured to calculate the final score of the target companion animal for a specific class based on the matching scores calculated for each patch.

The rule for combining the final scores for each patch for the specific class may include the product rule, sum rule, min/max rule, median rule and/or weighted sum rule.

In some embodiments, the weight in the weighted sum rule may be set based on the relative information amount included in the patch. In the above example in which the patch from which the features are extracted is the entire facial image, the first sub-patch including both eyes, the second sub-patch including the nose and the third sub-patch including the eyes and the nose, the entire facial image includes all the three feature points and has the widest patch region, and thus has the largest information amount, and the second sub-patch has one feature point and the narrowest patch region, and thus has the smallest information amount. Then, the weight Wtotal of the entire facial image having the largest information amount may be set to have the largest value (for example, 0.5), the weight Wsub1 of the first sub-patch having the next large information amount may be set to have the second largest value (for example, 0.3), the weight Wsub2 of the second sub-patch having the next large information amount may be set to have the third largest value (for example, 0.2), and the weight Wsub3 of the third sub-patch having the smallest information amount may be set to have the smallest value (for example, 0.1).

However, the above weight values are provided for illustration and variously set. The user may use a combination of best performance weights.

The determination part determines the final identifier of the target companion animal based on the calculated final score (or the set of final scores). For example, the identifier of the target companion animal is determined as an identifier of a class associated with the highest matching scores.

In particular embodiments, the companion animal identification system 1 may be implemented as a server; and a client device disposed at a remote location. The client device includes the image acquisition unit 100, The server includes the identification unit 500, The view correction unit 300 may be included in the server or the client device. The client device may include a variety of computing devices including a camera module and a processor, for example, smart phones, tablets, etc.

In other particular embodiments, the companion animal identification system 1 may be implemented as a single client device. In this case, the client device may include the image acquisition unit 100; the view correction unit 300; and the identification unit 500.

It will be obvious to those skilled in the art that the companion animal identification system 1 or some components may include other components not described herein. For example, the companion animal identification system 1 may include other hardware components necessary for the operation described herein, including a network interface, an input device for data entry, memory for storing data, and an output device for displaying or printing data or outputting data in other ways.

A companion animal identification method according to another aspect of the present disclosure is performed by a computing device including a processor. The computing device including the processor may include, for example, the companion animal identification system 1 or other computing device. Hereinafter, for clarity of description, the companion animal identification method will be described in more detail using the embodiments performed by the companion animal identification system 1.

Figure 10:
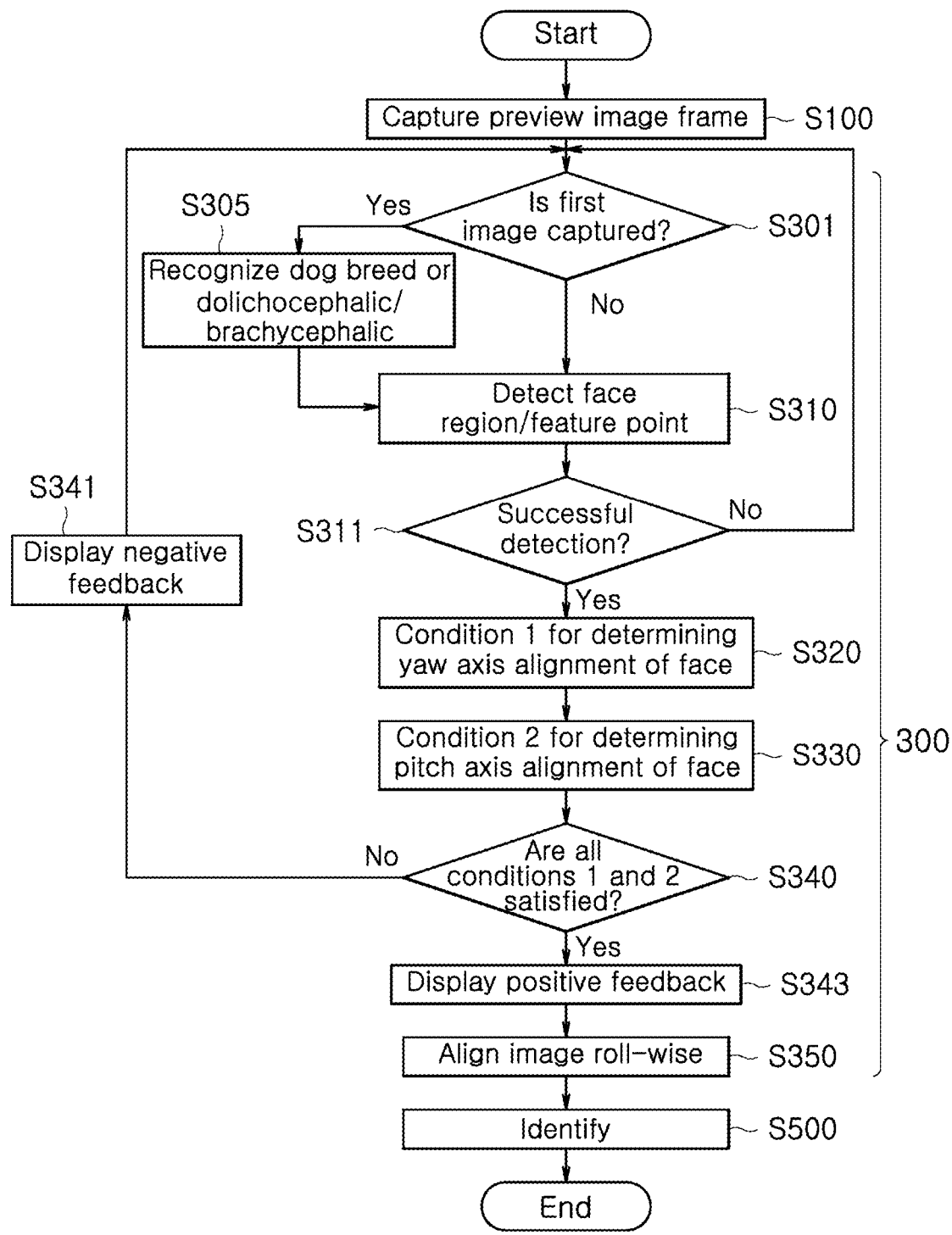
FIG. 10 is a flowchart of a companion animal identification method according to an embodiment of the present disclosure.

FIG. 10 is a flowchart of a companion animal identification method according to an embodiment of the present disclosure.

Since the steps of FIG. 10 are similar to the operation of the components of the companion animal identification system 1, difference(s) will be described below and the common description is omitted herein.

Referring to FIG. 10, the companion animal identification method includes acquiring a preview image for capturing the face of a target companion animal (S100). The preview image includes the face of the target companion animal.

The companion animal identification method includes checking if the face of the target companion animal is aligned according to a preset criterion (S300).

In an embodiment, the step S300 includes recognizing a species and/or physical features of the target companion animal (S305). The step S305 may be performed based on any of a plurality of images when the plurality of images is acquired for the same object. For example, when a plurality of image frames is captured in the preview image of the dog shown in FIG. 2, dog breed and/or dolichocephalic/brachycephalic may be recognized based on any one of the plurality of image frames (S305). In some embodiments, the step S300 further includes determining if it is the initially acquired image among the plurality of images for the same object (S301). Then, the step S305 is performed on the initially acquired image.

In the above embodiment, the step S300 includes detecting a face region and a feature point of the target companion animal in the preview image (S310). The step S310 is similar to the face region feature point detection operation of the view correction unit 300, and its detailed description is omitted herein.

In some embodiments, the step S300 may further include determining success or failure of the detection of the face region and/or all the preset feature points (S311). When the face region or at least one of the plurality of preset feature points is not detected, the step S310 may be performed on a different image after the different image is acquired, or the step S310 may be performed again on the same image as shown in FIG. 10.

The step S300 includes, after step S310, checking if the first alignment condition indicating alignment of the face of the target companion animal in the face image (for example, the preview image) of the target companion animal with respect to the yaw axis is satisfied (S320); checking if the second alignment condition indicating alignment of the face of the target companion animal with respect to the pitch axis is satisfied (S330); and determining if the first alignment condition and the second alignment condition are satisfied (S340).

In particular embodiments, the step S300 may further include providing a guide to satisfying an unsatisfied alignment condition to the user when at least one of the first alignment condition or the second alignment condition is not satisfied (S341). Additionally, the step S300 may further include providing a positive feedback when the first alignment condition and the second alignment condition are satisfied (S343).

In an embodiment, in the step S343, the image of the target companion animal is automatically acquired in response to the face of the target companion animal satisfying the first alignment condition and the second alignment condition. For example, the companion animal identification system 1 enables the image acquisition unit to capture the target companion animal in response to the face of the target companion animal satisfying the first alignment condition and the second alignment condition (S343).

The step S300 includes, after the step S340, aligning the face image of the target companion animal to align the face of the target companion animal with respect to the roll axis (S350).

The above steps S330 to S350 are similar to the operation of the view correction unit 300, and its detailed description is omitted herein.

The companion animal identification method includes the step (S500) of generating at least one sub-patch from the entire facial image of the face image of the target companion animal having the aligned face view; and extracting features from the entire facial image and the at least one sub-patch and classifying the extracted features for each patch using an identifier which matches the target companion animal for each patch.

Additionally, the step S500 includes identifying the target companion animal by determining a final identifier of the target companion animal by combining the matching results for each patch. Additionally, the step S500 includes providing the identification results to the user.

The above step S500 is similar to the operation of the identification unit 500, and its detailed description is omitted herein.

The system 1 and method for companion animal identification use not only the entire facial image but also the plurality of patch images which is divided into the sub-regions of eyes, nose and eyes/nose to identify the companion animal. The sub-patch is not affected by makeup, hair accessories, etc. As a result, it is possible identify the companion animal more accurately.

The operation by the system 1 and method for companion animal identification according to the embodiments as described above may be, at least in part, implemented in a computer program and recorded in a computer-readable recording medium. For example, it may be implemented with a program product on the computer-readable medium including program code, and may be executed by the processor for performing any or all of the above-described steps, operations or processes.

The computer may be a computing device such as a desktop computer, a laptop computer, a notebook computer, a smart phone or like, and may be any integrated device. The computer is a device having at least one alternative and specialized processor, memory, storage and networking component (either wireless or wired). The computer may run, for example, Microsoft Windows-compatible operating systems (OSs), and OSs such as Apple OS X or iOS, Linux distribution, or Google's Android OS.

The computer-readable recording medium includes all types of recording and identification devices in which computer-readable data is stored. Examples of the computer-readable recording medium include read only memory (ROM), random access memory (RAM), compact disc read only memory (CD-ROM), magnetic tape, floppy disk, and optical data storage and identification devices. Additionally, the computer-readable recording medium is distributed over computer systems connected via a network, and may store and execute the computer-readable code in a distributed manner. Additionally, a functional program, code and a code segment for realizing this embodiment will be easily understood by persons having ordinary skill in the technical field to which this embodiment belongs.

While the present disclosure has been hereinabove described with reference to the embodiments shown in the drawings, this is provided by way of illustration and those skilled in the art will understand that various modifications and variations may be made thereto. However, it should be understood that such modifications fall within the scope of technical protection of the present disclosure. Accordingly, the true technical protection scope of the present disclosure should be defined by the technical spirit of the appended claims.

INDUSTRIAL APPLICABILITY

The identification system according to an aspect of the present disclosure may recognize species and physical features of companion animals using machine learning technology which is one of the fourth industrial revolution technologies, detect face regions/feature points, and identify the companion animals.

Since the identification system is based on artificial intelligence technology, the convenience for users/companion animals increases, and there is a high usage possibility in

The invention claimed is:

1. A system for identifying a target companion animal, the system comprising:
   at least one processor; and
   a memory storing instructions which, when executed by the at least one processor, cause the at least one processor to:
   capture a face of the target companion animal;
   display a screen including a preview image of the face of the target companion animal;
   check if the face of the target companion animal is aligned according to a preset criterion;
   identify the target companion animal by extracting features from a face image of the target companion animal having an aligned face view; and
   calculate a connection vector including first and second feature points corresponding to both eyes of the face of the target companion animal, calculate a rotation matrix (T) of the connection vector, and align the connection vector into a non-rotated state based on the calculated rotation matrix (T) of the connection vector.

2. The system according to claim 1, wherein the instructions which, when executed by the at least one processor, further cause the at least one processor to:
   recognize an animal species of the target companion animal in the preview image of the target companion animal, and
   recognize physical features of the target companion animal in the preview image of the target companion animal.

3. The system according to claim 2, wherein the system further comprises a first model to which the preview image of the target companion animal is applied,
   the first model is a pre-trained machine learning model to extract first features from an input image and recognize the animal species of the companion animal in the input image based on the extracted features, and is trained using a first training dataset including a plurality of first training samples,
   each of the plurality of first training samples includes a face image of an animal, and
   each of the plurality of first training samples further includes at least one of species of the corresponding animal or subspecies of the corresponding animal.

4. The system according to claim 2, wherein the system further comprises a second model to which the preview image of the target companion animal is applied,
   the second model is a pre-trained machine learning model to extract second features from an input image and recognize physical features of the companion animal in the input image based on the extracted features, and is trained using a second training dataset including a plurality of second training samples, and
   each of the plurality of second training samples includes a face image of an animal and the physical features of the corresponding animal.

5. The system according to claim 4, wherein the physical features include dolichocephalic information or brachycephalic information when the corresponding animal is a dog.

6. The system according to claim 2, wherein the system further comprises a third model to which the preview image of the target companion animal is applied, and the third model is a machine learning model configured to extract third features from an input image and detect a face region and a feature point in the preview image of the target companion animal based on the extracted features.

7. The system according to claim 6, wherein the third model is trained using a third training dataset including a plurality of third training samples,
   each of the plurality of third training samples includes at least one of a face image and face region information or feature point information of the companion animal, and
   the face region information includes a location or size of the face region, and the feature point information includes a face component corresponding to the feature point and a location of the feature point.

8. The system according to claim 6, wherein the feature point includes at least one of a first feature point corresponding to a left eye, a second feature point corresponding to a right eye, or a third feature point corresponding to a nose.

9. The system according to claim 6, wherein the instructions which, when executed by the at least one processor, further cause the at least one processor to:
   check if a first alignment condition indicating alignment of the face of the target companion animal with respect to a yaw axis is satisfied,
   check if a second alignment condition indicating alignment of the face of the target companion animal with respect to a pitch axis is satisfied, and
   align the preview image of the target companion animal to align the face of the target companion animal with respect to a roll axis when the first alignment condition and the second alignment condition are satisfied, and
   wherein in the face of the target companion animal, a face view direction is the roll axis, an up or down direction is the pitch axis, and a lateral direction is the yaw axis.

10. The system according to claim 9, wherein the first alignment condition includes at least one of locations of left and right eyes disposed at a central part of an image frame or a location of a nose disposed at a center between the left eye and the right eye, and
    the second alignment condition includes alignment of the face such that an area of the face region in the image is equal or similar to a front view area of the face.

11. The system according to claim 9, wherein the instructions which, when executed by the at least one processor, further cause the at least one processor to provide a user with a guide for an unsatisfied alignment condition when the face of the target companion animal fails to satisfy at least one of the first alignment condition or the second alignment condition.

12. The system according to claim 9, wherein the instructions which, when executed by the at least one processor, further cause the at least one processor to capture the facial images of the target companion animal in response to the face of the target companion animal satisfying the first alignment condition and the second alignment condition.

13. The system according to claim 1, wherein the instructions which, when executed by the at least one processor, further cause the at least one processor to generate at least one sub-patch from an entire facial image including an entire face region of the target companion animal and having the aligned face view,
    the at least one sub-patch includes at least one of a first sub-patch, a second sub-patch or a third sub-patch, and
    the first sub-patch includes a first sub-region including first and second feature points corresponding to both eyes, the second sub-patch includes a second sub-region including a third feature point corresponding to a nose, and the third sub-patch includes a third sub-region including at least one of the first feature point or the second feature point and the third feature point.

14. The system according to claim 13, wherein the instructions which, when executed by the at least one processor, further cause the at least one processor to identify the target companion animal by applying the entire facial image and the at least one sub-patch to a fourth model, and the fourth model includes:
   a feature extraction part to extract fourth features from the entire facial image and the at least one sub-patch;
   a matching part to classify the entire facial image and each patch to a class of an identifier that matches the target companion animal based on the corresponding patch extracted features; and
   a determination part to determine a final identifier that matches the target companion animal based on the extracted features for the entire facial image and each patch or the matching results for the entire facial image and each patch.

15. The system according to claim 14, wherein the fourth model includes a pre-trained machine learning model using a fourth training dataset including a plurality of fourth training samples, and
   the fourth training dataset is split into subsets for each object allocated with each unique identifier.

16. The system according to claim 14, wherein the determination part determines the final identifier of the target companion animal by voting, bagging or boosting the acquired matching results for each patch and the entire facial image, when the matching results indicating the identifier of the class that matches the target companion animal for each patch and the entire facial image are acquired from the matching part.

17. The system according to claim 14, wherein the determination part is configured to: calculate a matching scores of the target companion animal for the class for each patch, the matching scores indicating an extent to which the target companion animal matches the class for each patch,
   combine the matching scores of the target companion animal for the class for each input, and
   determine the final identifier that matches the target companion animal based on the combination of the matching scores of the target companion animal for the class.

18. The system according to claim 17, wherein a rule for combining the matching scores includes at least one of product rule, sum rule, min/max rule, median rule or weighted sum rule.

19. A non-transitory computer-readable recording medium having stored thereon program instructions which are readable and executable by a computing device, the program instructions for performing, by a processor of the computing device, the steps of:
   acquiring a preview image for capturing a face of a target companion animal;
   checking if the face of the target companion animal is aligned according to a preset criterion, the checking comprising: calculating a connection vector including first and second feature points corresponding to both eyes of the face of the target companion animal, calculating a rotation matrix (T) of the connection vector, and aligning the connection vector into a non-rotated state based on the calculated rotation matrix (T) of the connection vector;
   capturing the face of the target companion animal when it is determined that the face of the target companion animal is aligned; and
   identifying the target companion animal by extracting features from a face image of the target companion animal having an aligned face view.

\* \* \* \* \*